United States Patent
Barashkov et al.

(10) Patent No.: US 6,462,128 B1
(45) Date of Patent: Oct. 8, 2002

(54) PROCESS OF MAKING FINELY DIVIDED OPAQUE PARTICLES

(75) Inventors: Nikolay N. Barashkov, Hercules; Thomas C. Molloy, Benicia, both of CA (US); Bansi Lal Kaul, Biel-Benken (CH); Jean-Christophe G. Graciet, Huningue (FR)

(73) Assignee: Clariant International Ltd., Muttenz (CH)

( * ) Notice: Subject to any disclaimer, the term of this patent is extended or adjusted under 35 U.S.C. 154(b) by 23 days.

(21) Appl. No.: 09/616,356

(22) Filed: Jul. 14, 2000

(51) Int. Cl.⁷ .................................................. C08L 61/22
(52) U.S. Cl. ...................................................... 524/597
(58) Field of Search .................................. 524/333, 597

(56) References Cited

U.S. PATENT DOCUMENTS

| | | | |
|---|---|---|---|
| 2,851,424 A | | 9/1958 | Switzer et al. |
| 3,928,272 A | | 12/1975 | Brancato et al. |
| 3,945,980 A | * | 3/1976 | Tsubakimoto ................. 260/39 |
| 3,981,845 A | | 9/1976 | Renner |
| 4,069,176 A | * | 1/1978 | Tsubakimoto ................. 260/39 |
| 4,767,807 A | * | 8/1988 | Fujikawa ...................... 524/36 |

FOREIGN PATENT DOCUMENTS

| | | |
|---|---|---|
| GB | 672763 | 5/1952 |
| GB | 748484 | 5/1956 |

OTHER PUBLICATIONS

U.S. patent application Ser. No. 09/905,803, filed Jul. 13, 2001.

* cited by examiner

*Primary Examiner*—Paul R. Michl
(74) *Attorney, Agent, or Firm*—Anthony A. Bisulca

(57) ABSTRACT

A new pigment for making colored finely divided particles on aminoformaldehyde resin allows to produce particles of substantially uniform particle size and spherical or irregular shape having excellent dispersibility and superior opacity.

5 Claims, No Drawings

PROCESS OF MAKING FINELY DIVIDED OPAQUE PARTICLES

BACKGROUND

This invention relates to a process of making colored finely divided opaque particles based on aminoformaldehyde resin having high surface area and being suitable as pigments in the fields of plastic, rubber, paint, paper coating and printing ink.

Processes for producing finely divided polymeric particles by adding a curing catalyst such as sulfuric acid to an aqueous solution of amino resin obtained by reacting urea or melamine with formaldehyde and then curing the resin with stirring, have been known in the past [GB 672763, GB 748484, U.S. Pat. No. 2,851,424]. However, these known processes possessed a number of shortcomings, since the amino-formaldehyde resin would rapidly harden in the presence of the curing catalyst to become insoluble and infusible. For instance, in these processes it is necessary to conduct the hardening reaction under strictly controlled conditions for obtaining a finely divided resin having a uniform particle size. Further, when it is intended to produce colored finely divided polymeric particles, there are imposed several restrictions like the class of dye that can be used and the time of its use in the case of the conventional processes, it being possible to obtain colored finely divided hardened resins only by adding water-soluble dyes when the amino resin is in an aqueous solution state and then hardening the resin.

Relatively recently, a number of approaches to improve the process of making finely divided polymeric particles has been disclosed. One approach entails the use of protective colloids, like water-soluble polymers which greatly increase the viscosity of aqueous solutions and make the hardening of the amino-formaldehyde resin more controllable [U.S. Pat. No. 3,981,845]. This method was used for making a highly dispersed insoluble and infusible urea-formaldehyde polymer having a specific surface area of more than 10 square meters per gram and an average particle size smaller than 5 microns.

The second approach includes the stage of formation of a water-in-oil emulsion when a water solution of urea-formaldehyde prepolymer is admixed with high shear to a non-solvent, like xylene [U.S. Pat. No. 3,928,272]. This process has been used for preparation of particles with an average diameter from 0.2 to 4 microns and a specific surface area up to 90 square meters per gram. A dispersing agent, like potassium tripolyphosphate, sodium hexamethaphosphate or sodium laurylsulfate is added to prevent the particles from clustering.

A third approach involves the preparation of a soluble and fusible aminoformaldehyde resin by reacting benzoguanamine or its mixture with melamine and formaldehyde in an aqueous medium, introducing this aqueous liquid to an aqueous solution of protective colloid with stirring to prepare a microemulsion, and adding a curing catalyst to said emulsion [U.S. Pat. Nos. 3,945,980, 4,069,176].

All three approaches lead to microspheres of mainly spheroidal shape consisting of crosslinked amino-formaldehyde polymer with an average particle size smaller than 5 microns. Because of the approximately spherical shape of the polymer particles having a substantially uniform size, the level of opacity of said products is limited.

In the present invention, a high degree of opacity is achieved with particles of an irregular shape of crosslinked amino-formaldehyde resin having high surface area and an average particle size below 1 micron. In addition, the level of opacity can be monitored and the shape (spherical or irregular) of particles changed, depending on the presence of surfactants (dispersing agents).

SUMMARY OF THE INVENTION

The instant invention provides novel highly dispersed particles of solid insoluble and infusible amino-formaldehyde condensation polymer in the form of a fluffy bright colored powder, said product having a specific surface area of more than 100 square meters per gram, said product essentially consisting of non-spherical microparticles having substantially uniform size and irregular shape (if no surfactants are used) or mainly spherical microparticles having mainly submicron size: up to 70% below 0.7 microns and up to 40% below 0.5 microns (if a surfactant or a mixture of surfactants are used).

A process for producing such finely divided particles in colored form comprises the steps of reacting in aqueous medium at a pH of 6–9 a member selected from the group consisting of either urea or benzoguanamine and a mixture of 100–0% by weight of urea and 0–100% by weight of benzoguanamine with formaldehyde in a ratio of 1 mol of the former to 1.3–3 moles of the latter to prepare an aqueous liquid of a soluble and fusible prepolymer, introducing this water-containing prepolymer into an organic solvent with boiling point below 80° C. and completely mixable with the water in a ratio of 70–30% by weight of prepolymer and 30–70% by weight of organic solvent, dyeing said mixture with a single fluorescent dye or a combination of several dyes, introducing with high shear the dyed resin-containing mixture in to an aqueous solution of protective colloid consisting o f 92–98.5 % of water, 1–3% of water-soluble polymer, 0–3% of a nonionic surfactant or a mixture of non-ionic and ionic surfactants and 0.5–2.0% of acidic curing catalyst at a reaction temperature in the range from 70–100° C., and thereafter separating the hardened resin from the suspension followed by drying and deaggregating the dried hardened resin.

DETAILED DESCRIPTION OF THE INVENTION

The dyed finely divided particles can be obtained in accordance with the present invention in the following manner. Either urea or benzoguanamine or a mixture of 100–0% by weight of urea and 0–100% by weight of benzoguanamine and 1.3–3 moles, preferably 1.5–2.5 moles, per mole thereof of formaldehyde are reacted at a pH range of 6–9, and preferably 7–8.5, and suitably a temperature in the range of 50–95° C., preferably 70–90° C. using water as the reaction medium to prepare an aqueous solution of a soluble and fusible prepolymer. The reaction time should appropriately be so long that the greater part of formaldehyde (about 90%) has the opportunity of reacting with either urea or benzoguanamine, but not so long that the molecular weight of the prepolymer becomes so high that it can not be homogeneously mixed with water-mixable organic solvent. Typical representatives of organic solvents are aliphatic ketones and alcohols, like acetone, methylethylketone, methanol or ethanol. The concentration of either urea or benzoguanamine or a mixture thereof and formaldehyde are selected so that the concentration of the prepolymer is in the optimum range of 20–35%, preferably 25–30% by weight.

Appropriately, the organic solvent is added to the prepolymer at a temperature in the range of 40–60° C. in a ratio of 70–30% by weight of prepolymer and 30–70% by weight of organic solvent. A ratio between the prepolymer and organic solvent is selected preferably so that complete solubility of fluorescent dyes in said mixture can be achieved. In the case where a water-soluble dye is used, a ratio of 70–50% by weight of prepolymer and 30–50% by weight of organic solvent is recommended. In the case where an oil-soluble (water-insoluble) dye is used, a ratio of 50–30% by weight of prepolymer and 50–70% by weight of organic solvent is recommended.

Appropriately, the typical representatives of water-soluble dyes are rhodamines, fluoresceines and some coumarins, containing ionic groups in their structure, like Basic Yellow 40. The typical representatives of oil-soluble (water-insoluble) dyes are coumarins, like Blankophor SOL, Solvent Yellow 135, naphthalimides and non-fluorescent polymer-soluble dyes, like heterocyclic compounds with structures I–IX or a combination of the above mentioned dyes in a ratio of 10–90% by weight of fluorescent dyes and 90–10% by weight of dye with structure (I)–(IX).

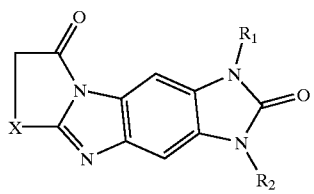

(I)

wherein $R_1$ and $R_2$ are identical or different and are hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen; and X is

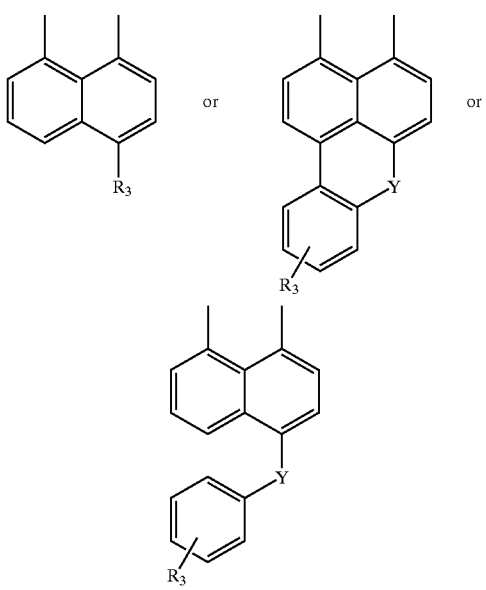

wherein $R_3$ is is hydrogen, halogen, —$NR_4R_6$, $R_6$—O— or $R_6$—S—, in which $R_6$ is $C_{1-6}$alkyl, $C_{6-10}$aryl $(C_{6-10})$ aryl-$(C_{1-6})$alkyl or $(C_{1-6})$alkyl-$(C_{6-10})$aryl, in which the alkyl and/or aryl radicals can be substituted by hydroxyl, $C_{1-6}$alkoxy, $C_{6-10}$aryloxy or halogen; and $R_4$ is hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen; and Y is sulphur, oxygen or N—$R_4$, in which $R_4$ has the meaning given above.

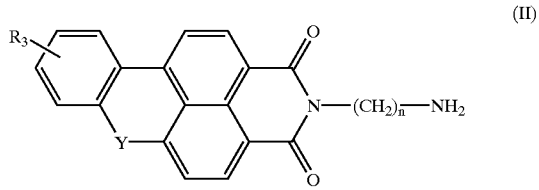

(II)

wherein $R_3$ and have the meanings given above; and n is 0–12.

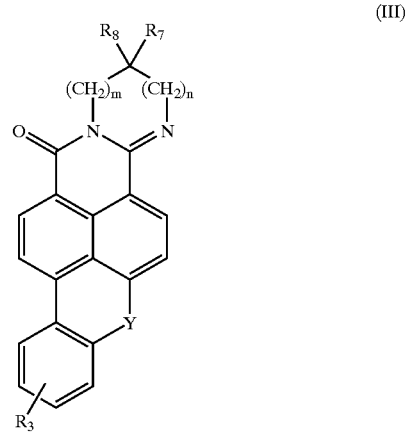

(III)

wherein $R_3$ and Y have the meanings given above;

$R_7$ and $R_8$ are identical or different and are hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen; and m and n are 0–12:

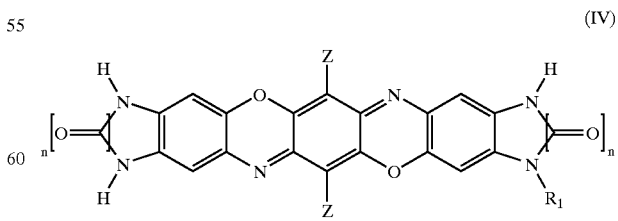

(IV)

wherein each $R_1$, independently, has the meaning given above; Z is hydrogen or halogen; and n is 1 or 2.

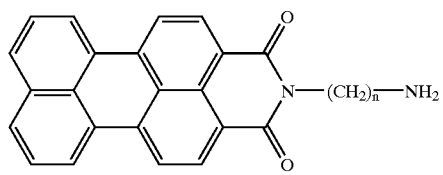

(V)

wherein n is 0–12.

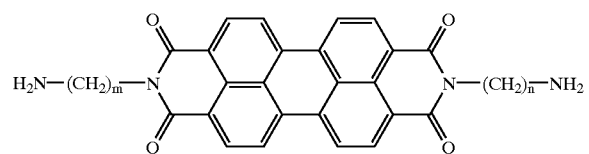

(VI)

wherein m and n are 0–12.

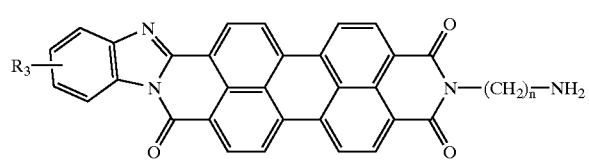

(VII)

wherein $R_3$ has the meaning given above; and n is 0–12.

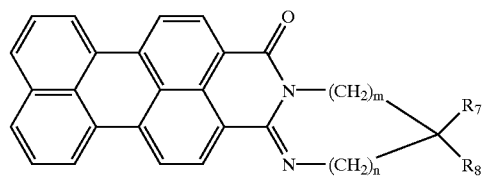

(VIII)

wherein $R_7$ and $R_8$ have meanings given above; and m and n are 0–12.

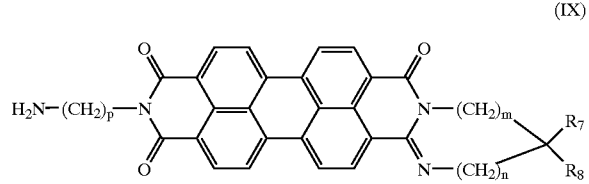

(IX)

wherein $R_7$ and $R_8$ have meanings given above; and m, n and p are 0–12.

The dyes with structures (I) to (IX) are, in part, novel compounds and can be prepared in accordance with well known processes. More particularly, dyes of structure (II) in which n is not zero or 2, all dyes of structures (III) and (V), dyes of structure (VI) in which m and n are not zero, 2 or 6, dyes of structure (VIII) in which m and n≠1, all dyes with structures (VII) and (IX) are novel. The processes for their preparation are as follows:

The corresponding dicarboxylic or tetracarboxylic acid anhydrides of the formulae

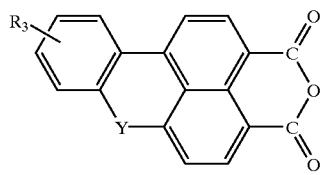

(II')

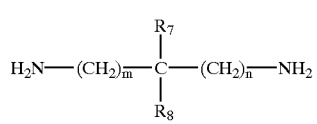

(V')

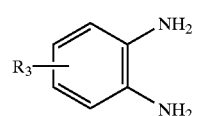

(VI')

are condensed with the corresponding alkylene diamines $$H_2N-(CH_2)_n-NH_2 \quad (X)$$

or

(XI)

and optionally further reacted resp. first reacted with an appropriate phenylene diamine (XII)

The respective reaction conditions can be chosen e.g. as in the preparation examples A to F.

Appropriately, the protective colloid solution in water is prepared separately with the concentration of water-soluble polymer being between 0.2 and 1%, preferably 0.4–0.7%. Typical representatives of this class of compounds are hydroxyethylcellulose, sodium salt of carboxymethylcellulose, methylcellulose, ethylcellulose, polyvinyl alcohol, and water-soluble polymers and copolymers of acrylic or methacrylic acid. The protective colloid is used in an amount of 5–30 parts by weight, preferably 12–20 parts by weight, per 100 parts by weight of prepolymer.

The dyed soluble and fusible prepolymer is transformed to the insoluble and infusible hardened resin by slowly adding with high shear (6000–7000 rpm with a Homomixer) the prepolymer-organic solvent mixture to an aqueous solution of protective colloid containing either no surfactants or a non-ionic surfactant or a mixture of non-ionic and ionic surfactants and an acidic curing catalyst at a reaction temperature in the range from 70–100° C. Appropriate non-ionic surfactants are Solsperse 41090 (Phosphated alkoxylated polymer from ZENECA Specialties), Surfinol CT-111 (2,4, 7,9-tetramethyl-5-decyn-4,7-diol from Air Product & Chemicals, Inc.) and Triton CF-10 (Alkylarylpolyether from Union Carbide). Examples of a mixture of non-ionic and ionic surfactants are the compositions of the above mentioned non-ionic surfactants and potassium tripolyphosphate, sodium lauryl sulfate or Surfinol CT-131 (from Air Product & Chemical, Inc.) in a ratio of 2–3 parts by weight of non-ionic and 1–2 parts by weight of ionic surfactant. These surfactants are effectively used in an amount in the range of 5–15 parts, preferably 8–12 parts by weight per 100 parts by weight of prepolymer. Appropriate curing catalysts are mineral acids such as hydrochloric, sulphuric and phosphoric acids, sulfonic acids such as benzenesulfonic, toluenesulfonic and dodecylbenzenesulfonic acids, organic acids such as phtalic, benzoic, oxalic and sulfamic acid. These acids are effectively used in an amount in the range of 0.1–5 parts, and preferably about 1–2 parts by weight per 100 parts by weight of prepolymer. The rate of adding the prepolymer-organic solvent mixture, as well as the temperature range of protective colloid solution is selected preferably so that the complete and fast evaporation of low-boiling point solvent from the said mixture can be achieved. In the case where acetone (b.p. 56° C.) or methanol (b.p. 65° C.) are used the temperature range of 70–85° C. is recommended. In the case where methylethylketone (b.p. 79° C.) or ethanol (b.p. 78° C.) are used the temperature range of 85–100° C. is recommended. There is a tendency that the particle shape of the resulting fine particles is changing from spherical to non-regular as the temperature of protective colloid solution is increased and the concentration of surfactants is decreased. In preparing an aqueous suspension of insoluble and infusible hardened resin, it is necessary to hold the temperature in the range of 70–100° C. for at least 1 hour, and preferably 2–4 hours with a continuing agitation with a Homomixer. When the hardening of the prepolymer is carried out in a short time of less than 1 hour or with no agitation, partial or total aggregation of the soluble and fusible resin is observed with the result of the formation of large particles or lumps in addition to the finely divided particles.

If no surfactants are present or a low concentration of surfactants (below 8 parts by weight per 100 parts of prepolymer) is used, a finely divided hardened resin is obtained by separating from the suspension and drying the resin with heating at a temperature ranging from 60 to 150° C. for about 2 to 10 hours and thereafter crushing the aggregates by means of a pin mill or jet mill. If a sufficient concentration of surfactants (higher than 8 parts by weight per 100 parts of prepolymer) is used, two main fractions of product can be obtained by filtration:

1. Up to 70–80% of the material is a stable (at least for 3–4 months) aqueous suspension of submicron particles: up to 70% below 0.7 microns and up to 40% below 0.5 microns. After an additional treatment, this suspension can be used in a wide range of applications, including the ink-jet inks.
2. Up to 20–30% of the material can be obtained as a dry powder by separating from the suspension and treating according to the same procedure as for material obtained with no surfactants present.

The resulting resin obtained by the invention process demonstrates extremely superior opacity, dispersibility, heat resistance and resistance to solvents when used as a pigment. Hence, the vividness and staining power of the dye used can be manifested effectively, the finely divided hardened resin of this invention can be used effectively in a very wide range of application.

The following examples will serve to more fully illustrate the invention. Unless otherwise specified, the parts and percentages used in the examples are on a weight to weight basis.

EXAMPLE 1

A 4-necked flask equipped with a stirrer, a reflux condenser and a thermocouple was charged with 150 parts of benzoguanamine, 50 parts of paraformaldehyde (formaldehyde content 95%) and 120 parts of water. The pH of the mixture was adjusted to 8.5 with a 10% aqueous solution of sodium carbonate. While agitating this mixture, its temperature was raised to 90° C., and its reaction was carried out for 5 hours to obtain an aqueous liquid of a soluble and fusible benzoguanamine-formaldehyde prepolymer. The prepolymer thus obtained is cooled to 50° C. and rapidly mixed with 100 part of acetone which has also been warmed to 500° C. The product is mixed with 3.0 parts of fluorescent dye Solvent Yellow 135 at temperature 40–50° C.

Separately, an aqueous protective colloid solution was prepared by dissolving in 400 part of water 3.0 parts of acrylamide/sodium acrylate copolymer (CYANAMER 370 produced by Cytec Industries Inc.). After raising the temperature of this aqueous solution to 80° C., 2.5 part of oxalic acid was added, and the mixture was stirred at 7000 rpm with a high speed agitator. While this aqueous solution of protective colloid was being stirred, the foregoing acetone solution of prepolymer was slowly introduced to the protective colloid solution within 1 hour to obtain a bright yellow suspension. Next, the suspension was held for 2 hours at 80° C. with an intense stirring.

The obtained product was separated from the suspension by filtration, and the filter cake was dried at a temperature of 100° C. followed by heating for 3 hours at a temperature of 150° C. to obtain 130 parts of aggregates of the finely divided hardened resin. After the process of deagglomeration by means of a jet mill the obtained product was examined with a scanning electron microscope. It was found that the particles were present discretely and they had an irregular shape with substantially uniform size. The finely divided hardened resin demonstrates extremely superior opacity, dispersibility, heat resistance and resistance to solvents when used as a pigment. The specific surface area of the particles as measured by the Brunauer, Emmet and Teller Method (hereinafter to be referred to as the BET Method) is 110 $m^2/g$.

EXAMPLE 2

A 4-necked flask equipped with a stirrer, a reflux condenser and a thermocouple was charged with 50 parts of urea, 100 parts of formalin (formaldehyde content 37%) and 110 parts of water. The pH of the mixture was adjusted to 7.5 with a 10% aqueous solution of sodium carbonate. While agitating this mixture, its temperature was raised to 70° C., and its reaction was carried out for 3 hours to obtain an aqueous liquid of a soluble and fusible urea-formaldehyde prepolymer. The prepolymer thus obtained is cooled to 50° C. and rapidly mixed with 100 part of acetone which has also been warmed to 50° C. The product is mixed with 2.0 parts of fluorescent dye Basic Yellow 40 at temperature 40–50° C.

Separately, an aqueous protective colloid solution was prepared by dissolving in 400 part of water 1.7 parts of hydroxyethylcellulose (NATROSOL 250MR produced by Hercules Inc.). After raising the temperature of this aqueous solution to 80° C., 1.5 part of sulphamic acid was added, and the mixture was stirred at 7000 rpm with a high speed agitator.

A finely divided hardened resin was prepared and treated by operating as in Example 1. The so obtained product, as in the case with the resin obtained in Example 1, exhibited excellent opacity (the specific surface area of the particles as measured by the BET Method is 120 m²/g) and dispersibility.

EXAMPLE 3

A 4-necked flask equipped with a stirrer, a reflux condenser and a thermocouple was charged with 40.5 parts of urea, 29.6 parts of benzoguanamine, 100 parts of formalin (formaldehyde content 37%) and 110 parts of water. The pH of the mixture was adjusted to 7.5 with a 10% aqueous solution of sodium carbonate. While agitating this mixture, its temperature was raised to 75° C., and its reaction was carried out for 4 hours to obtain an aqueous liquid of a soluble and fusible urea-benzoguanamine-formaldehyde prepolymer. The prepolymer thus obtained is cooled to 50° C. and rapidly mixed with 100 part of methanol which has also been warmed to 50° C. The product is mixed with 30 parts of the water solution of 1.62 parts of fluorescent dye Basic Yellow 40, 0.39 parts of Basonyl Red 485 and 0.21 parts of Basonyl Red 560 with preliminary adjustment of pH to 7.5 with 10% aqueous solution of sodium carbonate, at temperature 40–50° C.

Separately, an aqueous protective colloid solution was prepared by dissolving in 400 parts of water 8.0 parts of acrylamide/sodium acrylate copolymer (CYANAMER P-21 produced by Cytec Industries Inc.), 8.0 parts of Solsperse 41090 (Phosphated alkoxylated polymer from ZENECA Specialties), and 4.0 parts of SURFINOL CT-131 (produced by Air Product & Chemicals, Inc.). After raising the temperature of this aqueous solution to 80° C., 2.5 parts of oxalic acid was added, and the mixture was stirred at 7000 rpm with a high speed agitator. While this aqueous solution of protective colloid was being stirred, the foregoing methanol solution of prepolymer was slowly introduced to the protective colloid solution within 1 hour to obtain a bright red suspension. Next, the suspension was held for 2 hours at 80° C. with intense stirring.

A finely divided hardened resin was separated from the stable suspension of mostly spherical particles by filtration through Whatman filter paper # 4 and treated by the same operation as in Example 1. The finely divided hardened resin demonstrates extremely superior opacity, dispersibility, heat resistance and resistance to solvents when used as a pigment. The specific surface area of the particles is 107 m²/g. The stable suspension consists of mainly spherical particles having submicron size: up to 70%. below 0.7 microns and up to 40% below 0.5 microns.

EXAMPLE 4

A 4-necked flask equipped with a stirrer, a reflux condenser and a thermocouple was charged with 150 parts of benzoguanamine, 50 parts of paraformaldehyde (formaldehyde content 95%) and 120 parts of water. The pH of the mixture was adjusted to 8.5 with a 10% aqueous solution of sodium carbonate. While agitating this mixture, its temperature was raised to 90° C., and its reaction was carried out for 5 hours to obtain an aqueous liquid of a soluble and fusible benzoguanamine-formaldehyde prepolymer. The product is mixed with 2.0 parts of the dye with structure (I)

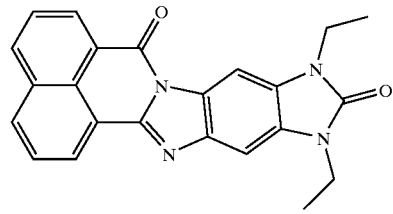

and 2.0 parts of Solvent Yellow 135 at temperature 85–90° C. for 15 min. The prepolymer thus obtained is cooled to 50° C. and rapidly mixed with 100 parts of acetone which has also been warmed to 500° C.

Separately, an aqueous protective colloid solution was prepared by dissolving in 400 part of water 1.7 parts of hydroxyethylcellulose (NATROSOL 250MR produced by Hercules Inc.). After raising the temperature of this aqueous solution to 80° C., 1.5 part of oxalic acid was added and the mixture was stirred at 2000 rpm with a high speed agitator.

A finely divided hardened resin was prepared and treated by operating as in Example 1. The so obtained product, as in the case with the resin obtained in Example 1, demonstrates extremely superior opacity, dispersibility, lightfastness, heat resistance and resistance to solvents when used as a pigment. The lightfastness of the obtained pigment is superior to the known yellow pigment containing 2.0 parts of Solvent Yellow 135 and 100 parts of prepolymer. The values for the retention of fluorescence intensity after irradiation in fade-o-meter for 104 hrs are 96 and 45%. The specific surface area of the particles as measured by the BET Method is 118 m²/g.

EXAMPLE 5

200 parts of prepolymer are prepared by operating as in example 4 and mixed with 4 parts of dye with the structure (II)

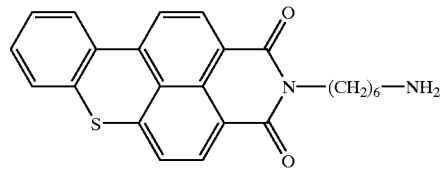

at temperature 85–90° C. for 15 min. The prepolymer thus obtained is cooled to 50° C. and rapidly mixed with 100 parts of methanol which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The obtained product, as in the case with the resin obtained in Example 1, demonstrates extremely opacity, dispersibility, heat resistance, lightfastness and resistance to solvents when used as a pigment.

EXAMPLE 6

200 parts of prepolymer are prepared by operating as in example 4 and mixed with 2 parts of dye with the structure (III)

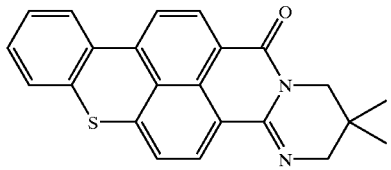
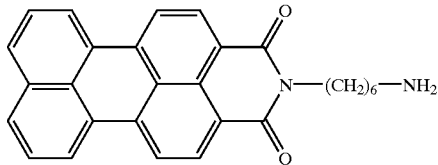

The prepolymer thus obtained is cooled to 50° C. and rapidly mixed with 100 parts of acetone which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The yellow color of the prepolymer-dye III solution in acetone became orange after the treatment with oxalic acid-hydroxyethylcellulose solution. The obtained product, as in the case with the resin obtained in Example 1, demonstrates extremely superior opacity, dispersibility, heat resistance, lighffastness and resistance to solvents when used as a pigment.

EXAMPLE 7

200 parts of prepolymer are prepared by operating as in example 4 and mixed with 4.0 parts of dye with the structure (IV)

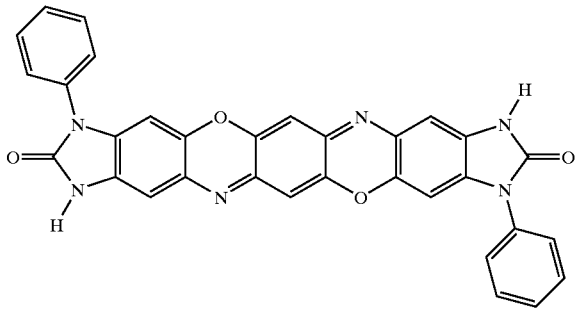

and 2.0 parts of optical brightener Blankophor SOL at temperature 85–90° C. for 15 min. The prepolymer thus obtained is cooled to 50° C. and rapidly mixed with 100 parts of acetone which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The obtained product, as in the case with the resin obtained in Example 1, demonstrates extremely superior opacity, dispersibility, heat resistance, lightfastness and resistance to solvents when used as a pigment.

EXAMPLE 8

200 parts of prepolymer are prepared by operating as in example 4 and mixed with 2.0 parts of dye with the structure (V)

and 2.0 parts of Solvent Yellow 135 at temperature 85–90° C. for 15 min. The prepolymer thus obtained is cooled to 50° C. and rapidly mixed with 100 parts of methanol which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The obtained product, as in the case with the resin obtained in Example 1, demonstrates extremely superior opacity, dispersibility, heat resistance, lighffastness and resistance to solvents when used as a pigment.

EXAMPLE 9

200 parts of prepolymer are prepared by operating as in example 4 and mixed with 2.0 parts of dye with the structure (VI) [in which m=2 and n=2] and 2.0 parts of Solvent Yellow 135 at temperature 85–90° C. for 15 min. The prepolymer thus obtained is cooled to 50° C. and rapidly mixed with 100 parts of methanol which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The obtained product, as in the case with the resin obtained in Example 1, demonstrates extremely superior opacity, dispersibility, heat resistance, lightfastness and resistance to solvents when used as a pigment.

EXAMPLE 10

200 parts of prepolymer are prepared by operating as in example 4 and mixed with 2.0 parts of dye with the structure (VII) [in which $R_3$=H and n=2] and 2.0 parts of Solvent Yellow 135 at temperature 85–90° C. for 15 min. The prepolymer thus obtained is cooled to 50° C. and rapidly mixed with 100 parts of methanol which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The obtained product, as in the case with the resin obtained in Example 1, demonstrates extremely superior opacity, dispersibility, heat resistance, lightfastness and resistance to solvents when used as a pigment.

EXAMPLE 11

200 parts of prepolymer are prepared by operating as in example 4 and mixed with 2.0 parts of dye with the structure (VIII)

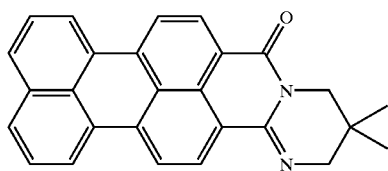

and 2.0 parts of Blankophor SOL at temperature 85–90° C. for 15 min. The prepolymer thus obtained is cooled to 50° C. and rapidly mixed with 100 parts of acetone which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The yellow color of the prepolymer-dye VIII solution in acetone became orange after the treatment with oxalic acid-hydroxyethylcellulose solution. The obtained product, as in the case with the resin obtained in Example 1, demonstrates extremely superior opacity, dispersibility, heat resistance, lighffastness and resistance to solvents when used as a pigment.

EXAMPLE 12

200 parts of prepolymer are prepared by operating as in example 4 and mixed with 2.0 parts of dye with the structure (IX) [in which $R_7$ and $R_8$=$CH_3$. m=1, n=1 and p=2] and 2.0 parts of Blankophor SOL at temperature 85–90° C. for 15 min. The prepolymer thus obtained is cooled to 50° C. and rapidly mixed with 100 parts of acetone which has also been warmed to 50° C.

Separately, an aqueous protective colloid solution containing 400 parts of water, 1.7 parts of hydroxyethylcellulose and 1.5 parts of oxalic acid was prepared by operating as in example 4. A finely divided hardened resin was prepared and treated by operating as in Example 1. The yellow color of the prepolymer-dye IX solution in acetone became orange after the treatment with oxalic acid-hydroxyethylcellulose solution. The obtained product, as in the case with the resin obtained in Example 1, demonstrates extremely superior opacity, dispersibility, heat resistance, lightfastness and resistance to solvents when used as a pigment.

Preparation Example A

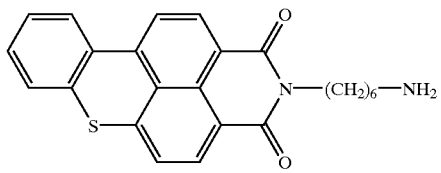

57 parts of hexamethylenediamine are melted at 80° C. under nitrogen atmosphere. 10 parts of benzolk[k,l]-thioxanthene-3,4-dicarboxylic acid anhydride are added over a 3 hours period at this temperature. After completion of the addition, the resulting fluorescent suspension is stirred for 2 hours at 80° C. 250 parts of water are then introduced at this temperature and the reaction mixture is stirred for one hour. The mixture is then added to 250 parts of hot water (80° C.). The final suspension is filtered at this temperature, washed with hot water (80° C.) and then dried. 12 parts of final colorant are obtained as an orange-colored powder.

Preparation Example B

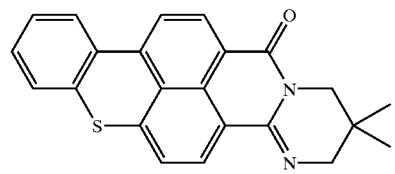

10 parts of benzo[k,l]-thioxanthene-3,4-dicarboxylic acid anhydride are suspended in 40 parts of dimethylformamide at 25° C. 0.1 part of p-toluenesulfonic acid anhydride and 14 parts of 1,3-diamino-2,2-dimethylpropane are added at this temperature under nitrogen atmosphere. The reaction mixture is heated to 130° C., stirred for 8 hours at this temperature under nitrogen atmosphere and then cooled to 25° C. The resulting fluorescent orange suspension is then filtered at 25° C., washed with methanol and dried. This gives 12 parts of a bright fluorescent orange powder.

Preparation Example C

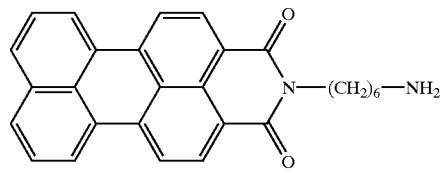

45 parts of hexamethylenediamine are melted at 80° C. under nitrogen atmosphere. 10 parts of perylene dicarboxylic acid anhydride are added over a 3 hours period at this temperature. After completion of the addition the resulting suspension is stirred for 2 hours at 80° C. 200 parts of water are then introduced at this temperature and the reaction mixture is stirred for one hour. The mixture is then added to 200 parts of hot water (80° C.). The final red suspension is filtered at this temperature, washed with hot water (80° C.) and then dried. This gives 13 parts of a red-colored powder.

Preparation Example D

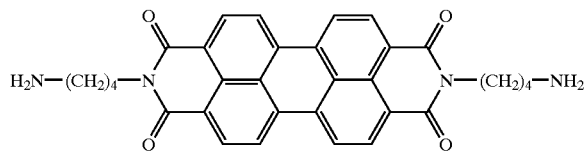

35 parts of tetramethylenediamine are melted at 100° C. under nitrogen atmosphere. 10 parts of perylene tetracarboxylic acid dianhydride are added over a 3 hours period at this temperature. The resulting red suspension is stirred for 6 hours at 100° C. 100 parts of 5% potassium hydroxide solution in water are then introduced at this temperature and the reaction mixture is stirred for 30 minutes. The suspension is then filtered at 80° C., washed with hot water (80° C.) and then dried. This gives 12 parts of a red-colored powder.

Preparation Example E

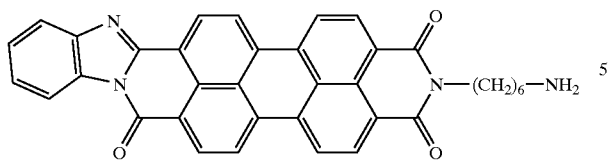

10 parts of perylene tetracarboxylic acid dianhydride and 5.7 parts of potassium hydroxide are suspended in 150 parts of water. The red suspension is heated to 100° C. and stirred at this temperature for 1 hour. The reaction mixture is cooled to 80° C. and hydrochloric acid is added until pH reached 7. The suspension is then stirred at 80° C. for 30 minutes, cooled to 25° C., washed with water and dried. 10 parts of the resulting red powder are suspended in 4 parts of o-phenylenediamine, 3 parts of zinc acetate and 1 part of chinolin. The reaction mixture is heated to 200° C. and stirred for 2 hours at this temperature. After cooling to 25° C. the reaction mixture is filtered and washed with methanol and then with water. Hydrochloric acid is added to 10 parts of the resulting red powder firstly suspended in 100 parts of water, in order to reach pH 1. The reaction mixture is stirred 30 minutes at 100° C., filtered and washed with water. 10 parts of the presscake are added over a 3 hours period to 20 parts of melted hexamethylenediamine at 100° C. under nitrogen atmosphere. The reaction mixture is stirred 4 hours at 100° C. and precipitated in 200 parts of hot water. The reaction mixture is then filtered at 80° C., washed with hot water and dried to provide 10 parts of a red-colored powder.

Preparation Example F

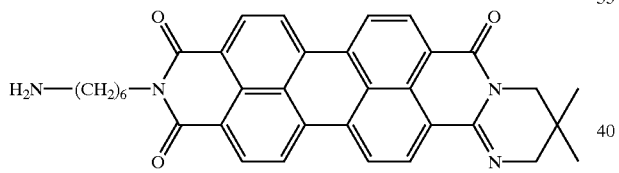

10 parts of perlene tetracarboxylic acid dianhydride and 5.7 parts of potassium hydroxide are suspended in 150 parts of water. The red suspension is heated to 100° C. and stirred at this temperature. for 1 hour. The reaction mixture is cooled to 80° C. and hydrochloric acid is added until pH reached 7. The suspension is then stirred at 80° C. for 30 minutes, cooled to 25° C., washed with water and dried. 10 parts of the red powder are suspended in 15 parts of water and 4 parts of 1,3-diamino-2,2-dimethylpropane. The reaction mixture is heated to reflux for 2 hours. After cooling to 25° C. the reaction mixture is filtered and washed with water. Hydrochloric acid is added to 10 parts of the resulting red presscake firstly suspended in 100 parts of water, in order to reach pH 1. The reaction mixture is stirred 30 minutes at 100° C., filtered and washed with water. 10 parts of the presscake are added over a 3 hours period to 20 parts of melted hexamethylenediamine at 100° C. under nitrogen atmosphere. The reaction mixture is stirred 4 hours at 100° C. and precipitated in 200 parts of hot water. The reaction mixture is then filtered at 80° C., washed with hot water and dried to provide 12 parts of a red-colored powder.

What is claimed is:

1. A process for producing dyed finely divided particles comprising, in combination, the steps of:

reacting in aqueous-medium at a pH of 6–9 a member selected from the group consisting of either urea or benzoguanamine or a mixture of 100–0% by weight of urea and 0–100% by weight of benzoguanamine with formaldehyde in a ratio of 1 mol of the former to 1.3–3 moles of the latter to prepare an aqueous liquid of a soluble and fusible prepolymer;

mixing this water-containing prepolymer with an organic solvent having a boiling point below 80° C. and being completely mixable with water in a ratio of 70–30% by weight of prepolymer and 30–70% by weight of organic solvent, dyeing said mixture with a single fluorescent dye or a combination of several dyes;

introducing with high shear the dyed resin-containing mixture into an aqueous solution of protective colloid consisting of 92–98.5 % of water, 1–3% of water-soluble polymer, 0–3% of a nonionic surfactant or a mixture of non-ionic and ionic surfactants and 0.5–2.0% of acidic curing catalyst at a reaction temperature in the range from 70–100° C., and thereafter;

separating the hardened resin from the suspension followed by drying and deaggregating the dried hardened resin.

2. The process of claim 1 wherein the fluorescent dye is either water-soluble or oil-soluble (water-insoluble).

3. The process of claim 1 wherein a combination of coumarines or naphthalimides with non-fluorescent polymer-soluble dye is used.

4. The process of claim 3 wherein the non-fluorescent polymer-soluble dye has the structure of one of the formulae:

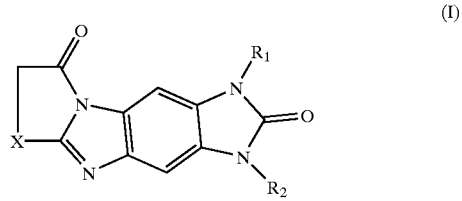

(I)

wherein $R_1$ and $R_2$ are identical or different and are hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen; and X is

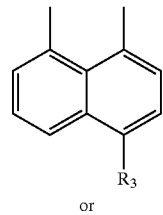

or

-continued

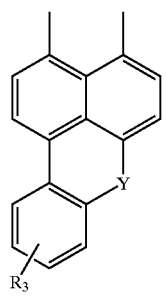

or

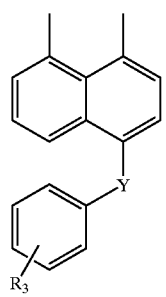

wherein
R₃ is hydrogen, halogen, —NR₄R₆, R₆—O— or R₆—S—, in which R₆ is $C_{1-6}$alkyl, $C_{6-10}$aryl, $(C_{6-10})$aryl-$(C_{1-6})$alkyl or $(C_{1-6})$alkyl-$(C_{6-10})$aryl, in which the alkyl and/or aryl radicals can be substituted by hydroxyl, $C_{1-6}$alkoxy, $C_{6-10}$aryloxy or halogen; and R₄ is hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen and Y is sulphur, oxygen or N—R₄, in which R₄ has the meaning given above;

(II)

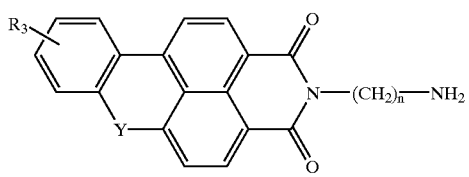

wherein R₃ and Y have the meanings given above and n is 0–12;

(III)

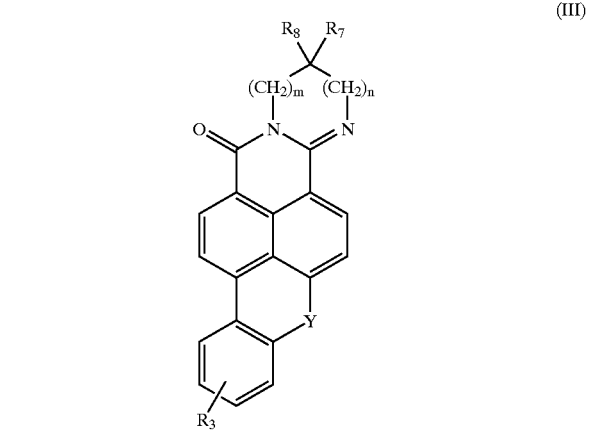

wherein
R₃ and Y have the meanings given above;
R₇ and R₈ are identical or different and are hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$ aryloxy or halogen and
m and n are 0–12;

(IV)

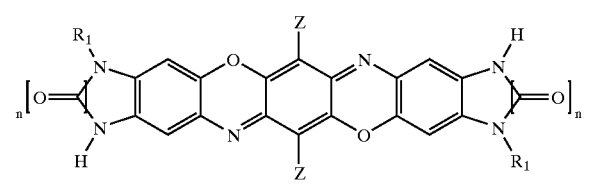

wherein
each R₁ independently, has the meaning given above;
Z is hydrogen or halogen; and n is 1 or 2;

(V)

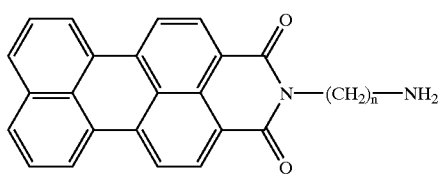

wherein n is 0–12;

(VI)

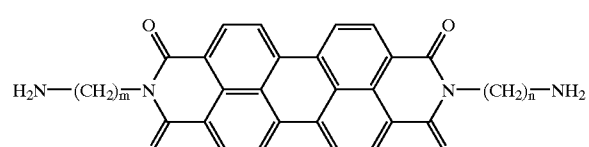

wherein m and n are 0–12;

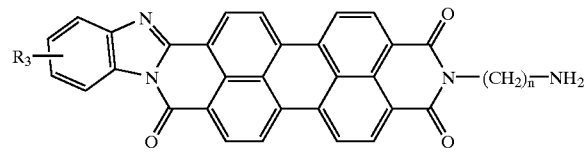
(VII)

wherein R$_3$ has the meaning given above; and n is 0–12;

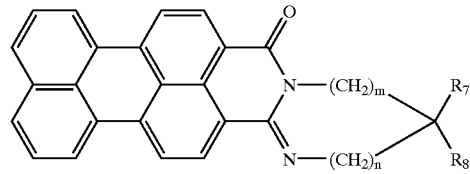
(VIII)

wherein R$_7$ and R$_8$ have the meanings given above; and m and n are 0–12;

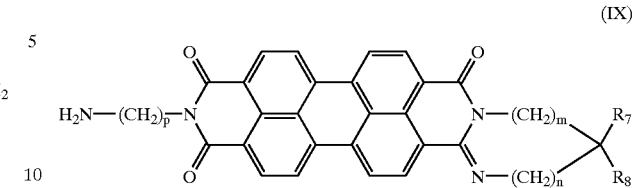
(IX)

wherein R$_7$ and R$_8$ have the meanings given above; and m, n and p are 0–12.

5. A dyed finely divided hardened resin of substantially uniform particle size, irregular shape, excellent dispersibility and opacity as prepared by the process of claim 4.

* * * * *